United States Patent
Thawani et al.

(10) Patent No.: US 11,193,693 B2
(45) Date of Patent: Dec. 7, 2021

(54) SOUND SUPPRESSION CHAMBER FOR AN HVAC AIR HANDLING ASSEMBLY

(71) Applicant: DENSO International America, Inc., Southfield, MI (US)

(72) Inventors: Prakash Thawani, Bloomfield Hills, MI (US); Steve Sinadinos, Commerce Township, MI (US); John Zvonek, Livonia, MI (US)

(73) Assignee: DENSO International America, Inc., Southfield, MI (US)

( * ) Notice: Subject to any disclaimer, the term of this patent is extended or adjusted under 35 U.S.C. 154(b) by 682 days.

(21) Appl. No.: 16/121,747

(22) Filed: Sep. 5, 2018

(65) Prior Publication Data

US 2020/0072494 A1    Mar. 5, 2020

(51) Int. Cl.
*F24F 13/24* (2006.01)
*F01N 1/02* (2006.01)
*G10K 11/172* (2006.01)
*B60H 1/00* (2006.01)

(52) U.S. Cl.
CPC ......... *F24F 13/24* (2013.01); *B60H 1/00757* (2013.01); *B60H 2001/006* (2013.01); *F24F 2013/245* (2013.01); *F24F 2013/247* (2013.01)

(58) Field of Classification Search
CPC .......... F01N 1/00; F01N 1/02; F01N 2490/14; F01N 2490/15; F01N 2490/20; G10K 11/172; F24F 13/24; F24F 2013/245; F24F 2013/247; Y10S 454/906; B60H 2001/006; F02M 35/1266
See application file for complete search history.

(56) References Cited

U.S. PATENT DOCUMENTS

| | | | | |
|---|---|---|---|---|
| 2,075,263 | A | * | 3/1937 | Bourne .................. F16L 55/033 181/256 |
| 3,323,305 | A | * | 6/1967 | Klees ..................... B62D 5/062 60/469 |
| 4,339,018 | A | * | 7/1982 | Warnaka .............. G10K 11/172 181/224 |
| 5,521,340 | A | | 5/1996 | Thawani et al. |

(Continued)

FOREIGN PATENT DOCUMENTS

| | | | | |
|---|---|---|---|---|
| DE | 102012019318 A1 | * | 4/2014 | ......... F02M 35/1266 |
| GB | 121212 A | * | 12/1918 | ............... F01N 1/06 |

(Continued)

*Primary Examiner* — Edgardo San Martin

(57) ABSTRACT

A sound suppression chamber for a heating, ventilation and air conditioning (HVAC) air handling assembly including a first end, a second end, and a middle portion. The first end includes an aperture that resonates with airflow from the HVAC air handling assembly, the airflow from the HVAC air handling assembly generating an incident sound wave corresponding to a target tone. The second end is closed and opposite the first end. The middle portion extends between the first end and the second end. The first end, the second end, and the middle portion defining a cavity of the sound suppression chamber. The sound suppression chamber generates a reflected wave that is 180 degrees out of phase from the incident sound wave and reflected into the HVAC air handling assembly through the aperture to suppress the target tone.

12 Claims, 5 Drawing Sheets

(56) References Cited

U.S. PATENT DOCUMENTS

| | | | | | |
|---|---|---|---|---|---|
| 6,009,705 | A | * | 1/2000 | Arnott | F01N 1/02 |
| | | | | | 60/312 |
| 6,153,286 | A | * | 11/2000 | Pfaffelhuber | B32B 5/26 |
| | | | | | 428/178 |
| 6,719,078 | B2 | * | 4/2004 | Nakamura | F02M 35/10013 |
| | | | | | 180/69.22 |
| 7,089,901 | B2 | * | 8/2006 | Kino | F02M 35/1222 |
| | | | | | 123/184.57 |
| 8,439,158 | B2 | * | 5/2013 | Tanase | G10K 11/04 |
| | | | | | 181/250 |
| 8,783,413 | B1 | | 7/2014 | Thawani et al. | |
| 9,951,792 | B2 | * | 4/2018 | Sinadinos | F04D 25/12 |
| 10,473,120 | B2 | * | 11/2019 | Thawani | F04D 29/4226 |
| 10,621,966 | B2 | * | 4/2020 | Kim | G10K 11/172 |
| 2007/0045042 | A1 | * | 3/2007 | Barz | B60H 1/00564 |
| | | | | | 181/250 |
| 2015/0369514 | A1 | * | 12/2015 | Groskreutz | F24F 13/24 |
| | | | | | 62/296 |
| 2016/0097315 | A1 | | 4/2016 | Becker et al. | |

FOREIGN PATENT DOCUMENTS

| | | | | | |
|---|---|---|---|---|---|
| GB | 2253076 | A | * | 8/1992 | G10K 11/172 |
| JP | 05240120 | A | * | 9/1993 | |
| WO | WO-0227118 | A1 | * | 4/2002 | F24F 13/24 |

\* cited by examiner

SOUND SUPPRESSION CHAMBER FOR AN HVAC AIR HANDLING ASSEMBLY

FIELD

The present disclosure relates to a sound suppression chamber for an automotive heating, ventilating, and air conditioning system.

BACKGROUND

This section provides background information related to the present disclosure and is not necessarily prior art.

Vehicles, such as automobiles, include climate control systems or heating, ventilating and air conditioning (HVAC) systems that function to heat, ventilate and cool a cabin or passenger compartment of a vehicle. HVAC systems include an HVAC air handling assembly. The HVAC air handling assembly includes an evaporator, a heater core or a positive terminal coefficient (PTC) heater (for electric vehicles), a fresh air inlet, a recirculated air inlet, and a blower wheel driven by an electric motor for drawing air from one or both of the inlets. The air may be subsequently heated, with the heater core, or cooled, with the evaporator, and discharged into the passenger compartment through one or more of a plurality of vents. Operation of the HVAC system may generate undesirable sounds, which may adversely affect vehicle occupants' comfort and enjoyment of the vehicle. A particular source of the undesirable sounds is aerodynamically induced air rush noise generated by airflow in the HVAC air handling assembly. The present disclosure provides a sound suppression system for an HVAC system that will reduce audible noise and improve sound quality in the passenger compartment while improving or maintaining airflow characteristics and/or other operating conditions throughout the HVAC system.

SUMMARY

This section provides a general summary of the disclosure, and is not a comprehensive disclosure of its full scope or all of its features.

In a feature, a sound suppression chamber for a heating, ventilation and air conditioning (HVAC) air handling assembly is described. The sound suppression chamber includes a first end, a second end, and a middle portion. The first end includes an aperture that resonates with airflow from the HVAC air handling assembly, the airflow from the HVAC air handling assembly generating an incident sound wave corresponding to a target tone. The second end is closed and opposite the first end. The middle portion extends between the first end and the second end. The first end, the second end, and the middle portion defining a cavity of the sound suppression chamber. The sound suppression chamber generates a reflected wave that is 180 degrees out of phase from the incident sound wave and reflected into the HVAC air handling assembly through the aperture to suppress the target tone.

In further features, the first end includes at least one retention member. The at least one retention member is coupled to an aperture of an outer surface of the HVAC air handling assembly.

In further features, at least one dimension of the sound suppression chamber is selected based on a quarter wavelength of a frequency of the target tone to be suppressed.

In further features, at least one dimension of the sound suppression chamber is selected based on a quarter wavelength of a center frequency corresponding to a broadband frequency range to be suppressed.

In further features, the sound suppression chamber has a rectangular shape.

In further features, the sound suppression chamber is integrally formed with the HVAC air handling assembly.

In further features, the sound suppression chamber is positioned perpendicular to an outer surface of the HVAC air handling assembly.

In further features, the sound suppression chamber includes at least one partition that forms a first subchamber of the sound suppression chamber and a second subchamber of the sound suppression chamber. At least one dimension of the first subchamber is based on a frequency of a first tone to be suppressed. At least one dimension of the second subchamber is based on a frequency of a second tone to be suppressed. The frequency of the first tone and the frequency of the second tone are different frequencies.

In further features, the at least one partition is adjustable.

In a feature, a method for installing a sound suppression chamber of an HVAC air handling assembly is described. The method includes selecting a sound suppression chamber from a plurality of sound suppression chambers designed to suppress a target tone generated by airflow within the HVAC air handling assembly. The method further includes removing a portion of a weakened section of an outer surface of the HVAC air handling assembly to create an aperture in an outer surface of the HVAC air handling assembly. The method further includes coupling the sound suppression chamber to a coupling member of the weakened section of the outer surface the HVAC air handling assembly where the sound suppression chamber includes a first end, a middle portion, and a second end; the middle portion extending between the first end and the second end; the first end including an aperture that receives airflow from the HVAC air handling assembly; the second end of the sound suppression chamber being closed and opposite the first end; the second end and the middle portion defining a cavity of the sound suppression chamber; the airflow from the HVAC air handling assembly generates an incident sound wave corresponding to the target tone; and the sound suppression chamber generates a reflected wave that is 180 degrees out of phase from the incident sound wave and reflected into the HVAC air handling assembly through the aperture of the sound suppression chamber to suppress the target tone.

In further features, the method includes partitioning the sound suppression chamber to create a first subchamber and a second subchamber where at least one dimension of the first subchamber is based on a frequency of a first tone to be suppressed; at least one dimension of the second subchamber is based on a frequency of a second tone to be suppressed; and the frequency of the first tone and the frequency of the second tone are different frequencies.

In further features, at least one dimension of the sound suppression chamber is selected based on a quarter wavelength of a frequency of the target tone to be suppressed.

In further features, at least one dimension of the sound suppression chamber is selected based on a quarter wavelength of a center frequency corresponding to a broadband frequency range to be suppressed.

In further features, the sound suppression chamber has a rectangular shape.

In further features, the sound suppression chamber is positioned perpendicular to the outer surface of the HVAC air handling assembly.

In a feature, a heating, ventilation and air conditioning (HVAC) air handling assembly is described. The HVAC air handling assembly includes a blower subassembly; an HVAC subassembly; a plenum chamber that connects the blower subassembly and the HVAC subassembly; and at least a first sound suppression chamber that is coupled to the plenum chamber in in order to suppress a target tone generated by airflow within the HVAC air handling assembly, where the first sound suppression chamber includes a first end, a middle portion, and a second end; the first end includes an aperture that receives airflow from the HVAC air handling assembly; the middle portion extends between the first end and the second end; the second end of the first sound suppression chamber being closed; the first end, the second end, and the middle portion defining a cavity of the first sound suppression chamber; the airflow from the HVAC air handling assembly generates an incident sound wave corresponding to the target tone; and the first sound suppression chamber generates a reflected wave that is 180 degrees out of phase from the incident sound wave and reflected into the HVAC air handling assembly through the aperture of the first sound suppression chamber to suppress the target tone.

In further features, the plenum chamber includes at least one weakened section. The at least one weakened section includes a coupling member and a removable portion. The removable portion is configured to be removed to create an aperture in an outer surface of the plenum chamber. The first end includes at least one retention member. The at least one retention member is coupled to the coupling member of the at least one weakened section.

In further features, the first sound suppression chamber includes at least one partition that forms a first subchamber of the first sound suppression chamber and a second subchamber of the first sound suppression chamber. At least one dimension of the first subchamber is based on a frequency of a first tone to be suppressed. At least one dimension of the second subchamber is based on a frequency of a second tone to be suppressed. The frequency of the first tone and the frequency of the second tone are different frequencies.

In further features, the at least one partition is adjustable.

In further features, the HVAC air handling assembly includes a second sound suppression chamber, a third sound suppression chamber, and a fourth sound suppression chamber where the first sound suppression chamber and the second sound suppression chamber have a first set of dimensions; the third sound suppression chamber and the fourth sound suppression chamber have a second set of dimensions; and the first set of dimensions and the second set of dimensions include different dimensions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

A heating, ventilation, and air cooling (HVAC) assembly includes, for example, a blower wheel driven by an electric motor, inlet and outlet ducts, irregular shaped chambers and cavities, and non-uniform cross-section ducts with registers and restrictive heat exchangers, such as heater cores and evaporators. As airflow passes through the HVAC air handling assembly, various noises may occur, such as aerodynamically induced air rush noises and or hollow tones and/or tones induced by excitation of chamber resonances. Since there is limited space between the HVAC air handling assembly and dash insulator of a vehicle, conventional noise control approaches, for example, using mufflers and/or sound absorbers may be costly and may negatively affect airflow performance. Sound suppressing devices that selectively target and suppress sounds caused by air flowing through an HVAC air handling assembly without sacrificing airflow strength and heating/cooling performance are thus desirable.

Figure 1:
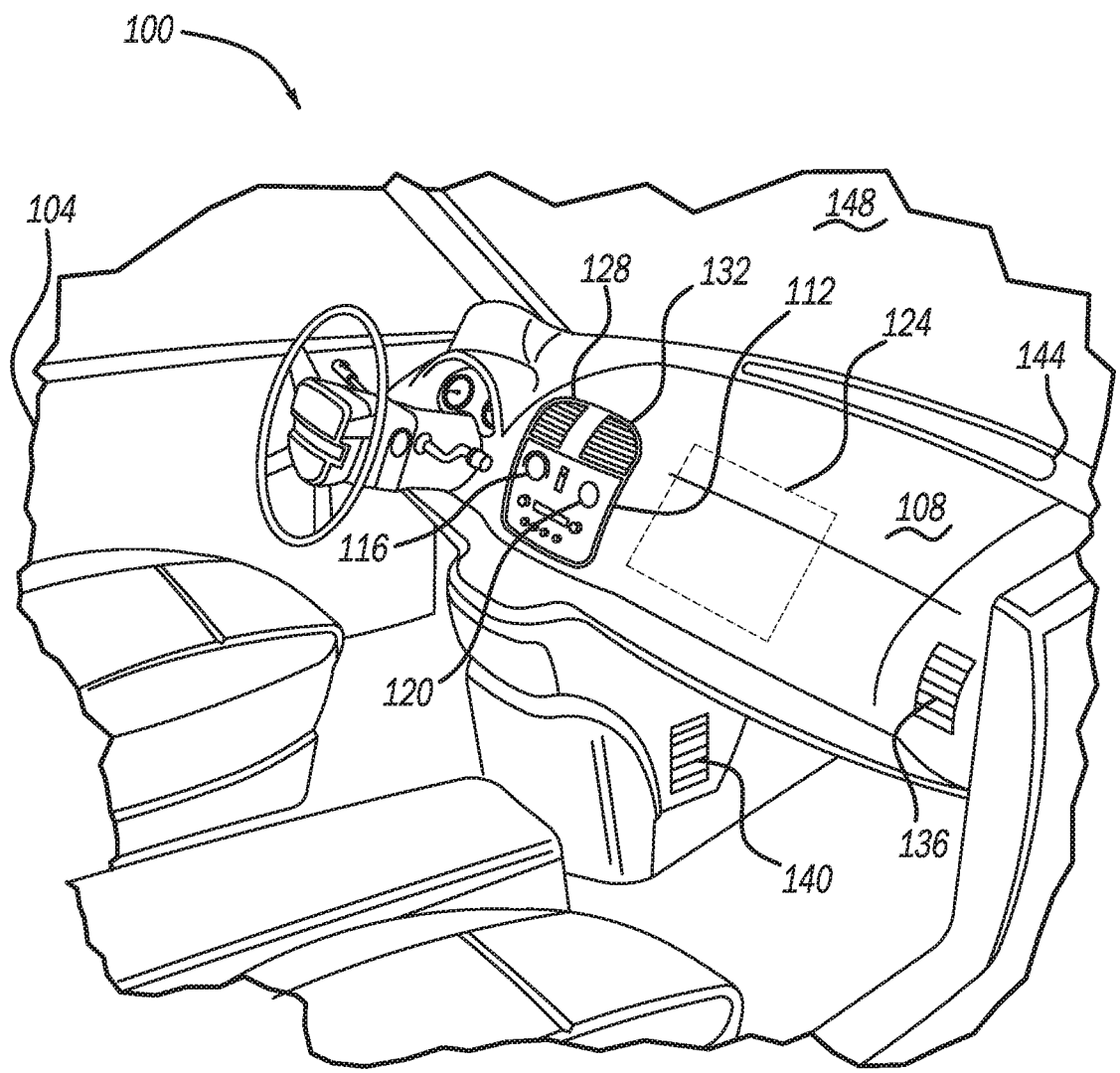
FIG. 1 is a perspective view of a vehicle interior depicting an example location of an HVAC air handling assembly according to the present teachings.

Referring to FIG. 1, a vehicle 100 has a vehicle interior 104 with a dash 108 that exhibits an HVAC control panel 112. The HVAC control panel 112 may include a first control knob 116 and a second control knob 120 to control functions of an HVAC air handling assembly 124. The HVAC air handling assembly 124 may be located immediately behind the dash 108, such as behind the HVAC control panel 112; however, the HVAC air handling assembly 124 may be positioned in various positions in vehicle 100, such as in the rear of a vehicle, and the teachings of the present disclosure may be applicable to the HVAC air handling assembly 124 regardless of location.

While the first control knob 116 and the second control knob 120, as an example, may be used to control specific doors within the HVAC air handling assembly 124 to control airflow into the vehicle interior 104, such as whether airflows out of dash vents 128, 132, 136 to direct air at the face and the torso of passengers, from a floor vent 140 to direct air at the feet of a passenger, or from a defroster vent 144 to direct airflow at an interior surface of a windshield 148. The first control knob 116 and the second control knob 120 may be used to switch or alter the air supply into the vehicle interior 104 via vents 128, 132, 136, and 140 from an exterior air supply to a recirculation air supply.

Figure 2A:
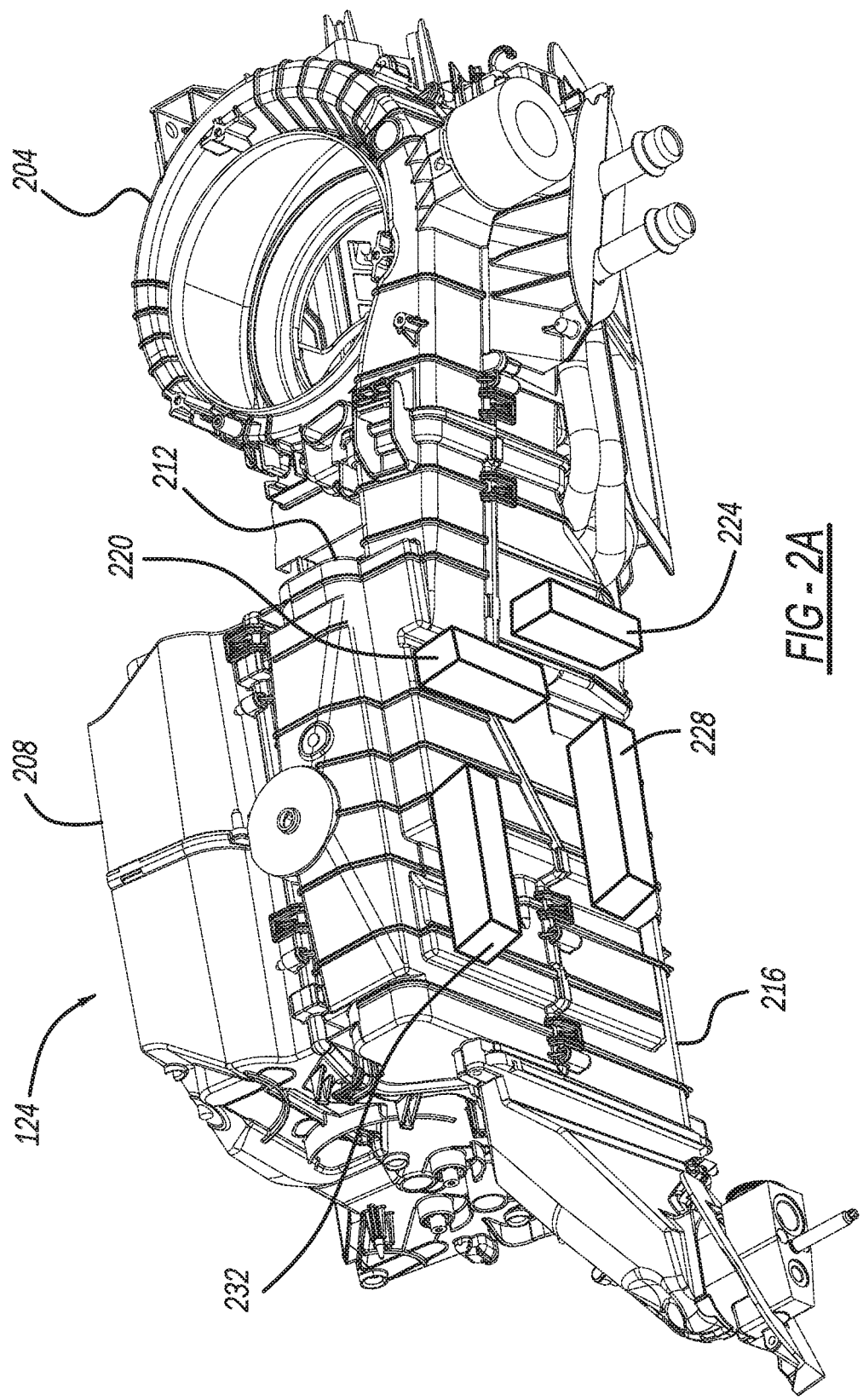
FIGS. 2A and 2B are views of an HVAC air handling assembly according to the present teachings.

With reference to FIG. 2A, a rear view of the HVAC air handling assembly 124 is shown. The HVAC air handling assembly 124 may be configured for a right hand drive vehicle or a left-hand drive vehicle. The HVAC air handling assembly 124 includes a blower subassembly 204, an HVAC subassembly 208, a fresh air inlet, and a recirculated air inlet. The HVAC subassembly 208 includes an evaporator and a heater core (not specifically shown) or a PTC heater for electric vehicles (not specifically shown). The blower subassembly 204 includes a blower wheel driven by an electric motor for drawing air from one or both of the inlets.

A plenum chamber 212 is between, and generally connects, the blower subassembly 204 and the HVAC subassembly 208. The plenum chamber 212 can be made of any suitable material, such as a suitable polymeric material. The blower subassembly 204 and the HVAC subassembly 208 can also be made of a polymeric material, and can include other materials as well, such as any suitable metallic material.

A first sound suppression chamber 220, a second sound suppression chamber 224, a third sound suppression chamber 228, and a fourth sound suppression chamber 232 are mounted or coupled to the HVAC air handling assembly 124. While FIG. 2A shows the first sound suppression chamber 220, the second sound suppression chamber 224, the third sound suppression chamber 228, and the fourth sound suppression chamber 232, any number of sound suppression chambers may be used. The teachings of the present disclosure are discussed in terms of the first sound suppression chamber 220; however, the teachings of the present disclosure are equally applicable to any sound suppression chamber.

The first sound suppression chamber 220 is configured to suppress an undesirable tone such as aerodynamically induced air rush noise or other noises generated by airflow in the HVAC air handling assembly 124. The first sound suppression chamber 220 is shown as having a rectangular shape in FIG. 2A, but may have any other suitable shape. The first sound suppression chamber 220 includes a first end, a middle portion, and a second end. The first end has an opening or aperture and is mounted or coupled to a weakened portion of an outer surface 216 of the plenum chamber 212. A second end is closed and located opposite the first end. The middle portion connects the first end and the second end. The first end, the second end, and the middle portion define a cavity portion of the first sound suppression chamber 220. The cavity allows airflow from the HVAC air handling assembly to resonate with the first sound suppression chamber 220. The second end generally extends away from the HVAC air handling assembly 124.

Figure 2B:
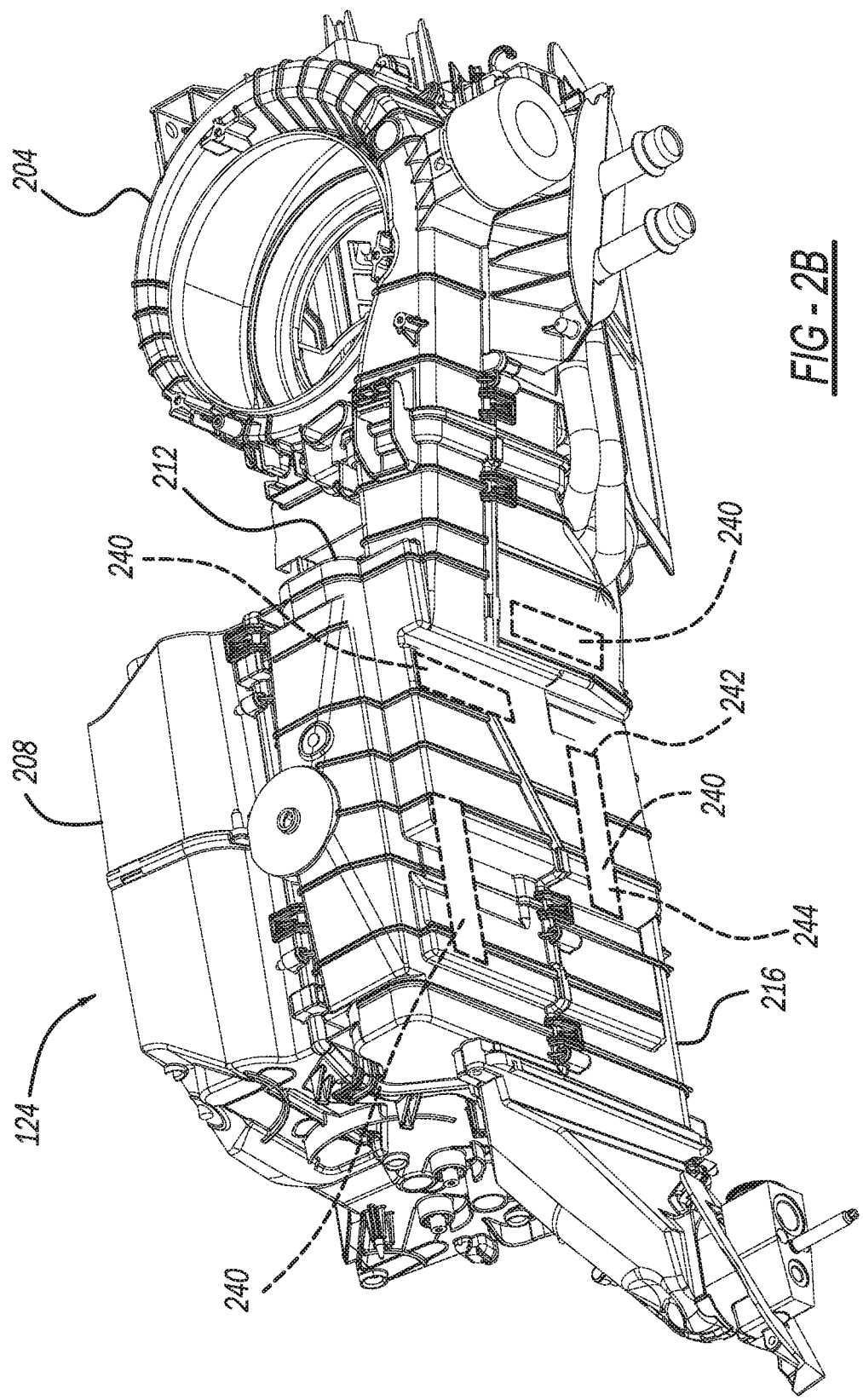

With reference to FIG. 2B, the outer surface 216 includes a plurality of weakened sections 240. The plurality of weakened sections 240 are rectangular, but can be any suitable shape. Each of the plurality of weakened sections 240 includes a coupling member 242 and a removable portion 244. The coupling member 242 surrounds the removable portion 244. The removable portion 244 is removable with the application of force. Upon removable of the removable portion 244, the coupling member 242 defines an aperture that extends through the outer surface 216.

The plurality of weakened sections 240 may be at any suitable location about the HVAC air handling assembly 124. For example, the weakened sections are described as being located at the outer surface 216 but may be at another suitable location such as at the blower subassembly 204 and the HVAC subassembly 208. Although the first sound suppression chamber 220 is described throughout the disclosure in conjunction with HVAC air handling assembly 124, the first sound suppression chamber 220 may be used with any suitable device, component, or part, and in conjunction with any method or application to suppress undesirable sounds and tones.

The first sound suppression chamber 220, when installed, fully covers the respective weakened section of the plurality of weakened sections 240. The first sound suppression chamber 220 may be located at any suitable location about the HVAC air handling assembly 124, as long as there is a corresponding weakened section. The first sound suppression chamber 220 may further be used at any location throughout a vehicle, and with non-vehicle applications. For example, the first sound suppression chamber 220 may be used with any airflow system, such as a building airflow system. The first sound suppression chamber 220 may be made of any suitable material, such as a compliant material. Suitable compliant materials include, but are not limited to, any suitable rubber material, polymeric material, or flexible metallic material.

Dimensions of the first sound suppression chamber 220 are selected based on a frequency of a specific target tone that is desired to be suppressed, such as based on a quarter wavelength of a center frequency corresponding to a broadband frequency range. For example, target tones ranging from 500 to 2500 Hz may be desired to be suppressed. A sound suppression chamber that is designed to suppress a tone of 500 Hz would have a longer length than a sound suppression chamber that is designed to suppress a tone of 2500 Hz. Therefore, dimensions of a sound suppression chamber are selected after the desired target tone to be suppressed has been identified.

While the HVAC air handling assembly in FIGS. 2A and 2B is configured with the first sound suppression chamber 220 positioned perpendicular to the outer surface 216 of the HVAC air handling assembly 124, the first sound suppression chamber 220 may be positioned at a lesser or greater angle than shown in FIGS. 2A and 2B (that is, at an inclined position) so as to allow for tighter packaging of the HVAC air handling assembly 124.

Figure 5:
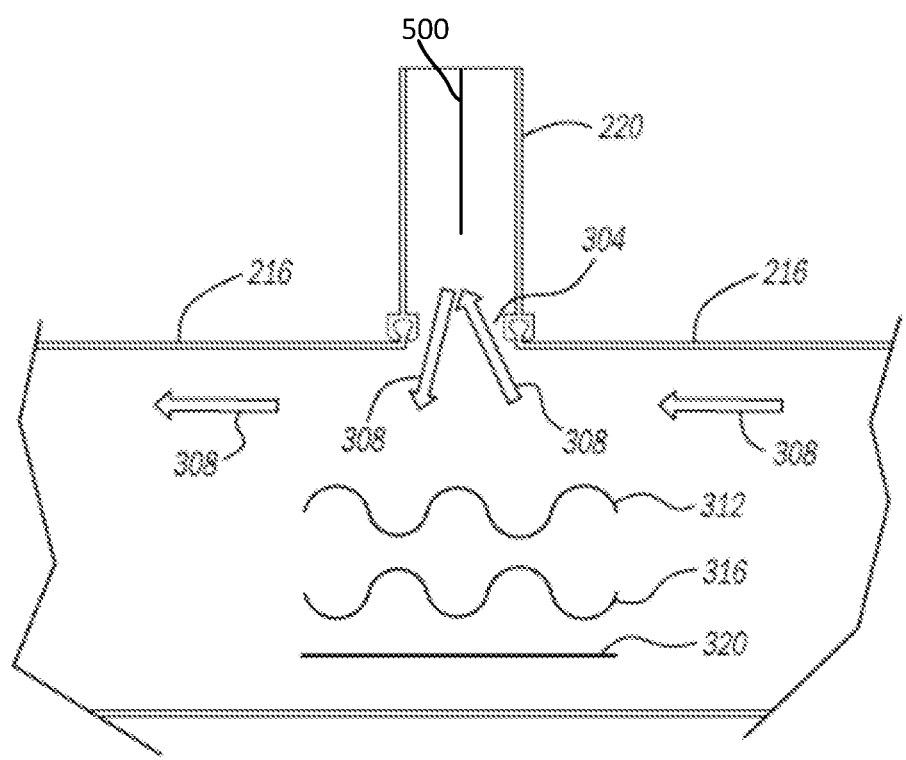
FIG. 5 is a cross-sectional view cross-sectional view of a connection between a sound suppression chamber and HVAC air handling assembly according to the present teachings.

The first sound suppression chamber 220 may be partitioned into a first subchamber and a second subchamber. The dimensions of the first subchamber are based on a frequency of a first target tone to be suppressed and the dimensions of the second subchamber are based on a frequency of a second target tone to be suppressed. While the example is provided that the first sound suppression chamber 220 may be partitioned into two subchambers, the first sound suppression chamber 220 may be partitioned multiple times to create more than two subchambers. This allows for a single sound suppression chamber to suppress tones of different frequencies. With reference to FIG. 5, the partition 500 may be moveable within the first sound suppression chamber 220 allowing for the size of the first subchamber and the second subchamber to be adjusted.

Figure 3:
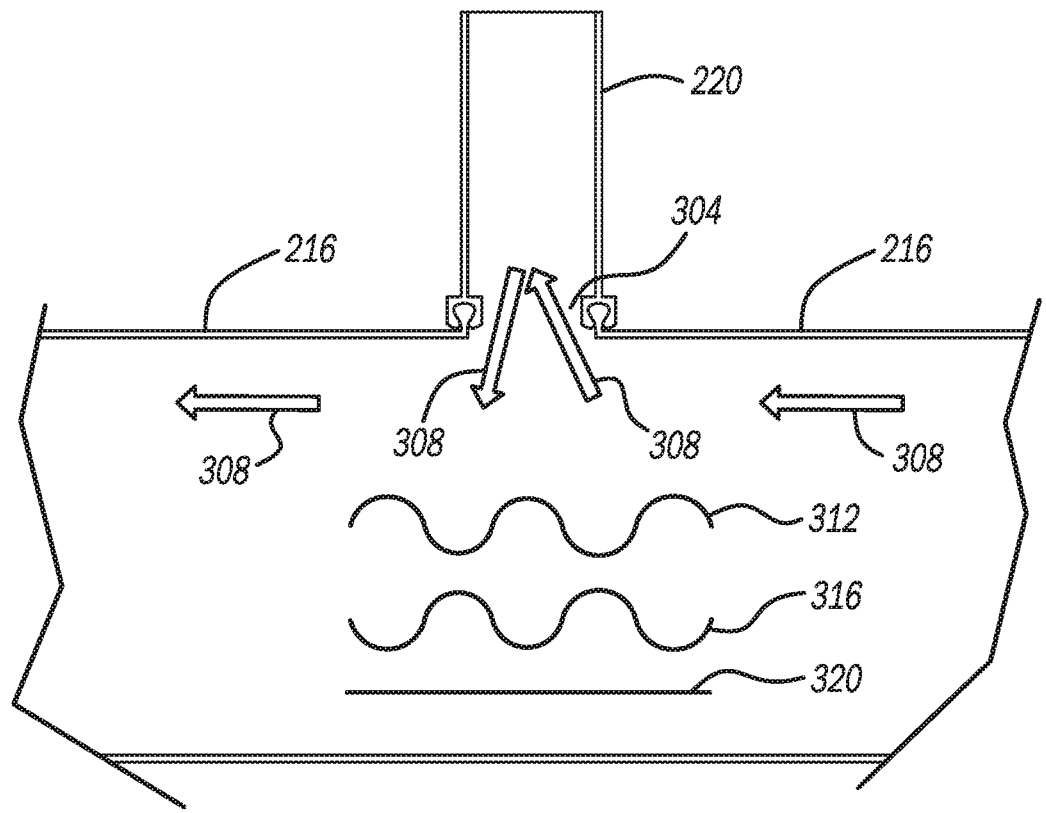
FIG. 3 is a cross-sectional view of a connection between a sound suppression chamber and HVAC air handling assembly according to the present teachings.

With reference to FIG. 3, the first sound suppression chamber 220 is coupled to the outer surface 216 at a location of the respective weakened section of the plurality of weakened sections 240. Airflow 308 and corresponding incident wave 312 (i.e., the sound wave) generated by the airflow 308 passes into the first sound suppression chamber 220 at an aperture 304 and travels back through the aperture 304. As a result, the first sound suppression chamber 220 generates or reflects a reflected wave 316 that is the same or similar frequency and amplitude of the incident wave 312 of the target tone but that is 180 degrees out of phase from the incident wave 312. The reflected wave 316 and the incident wave 312 effectively cancel each other out under ideal circumstances (achieving full phase cancellation or full destructive interference) or reduce the amplitude of the incident wave considerably as shown by modified wave 320, provided the dimensions correspond to the quarter wavelength of the undesirable frequencies.

Figure 4:
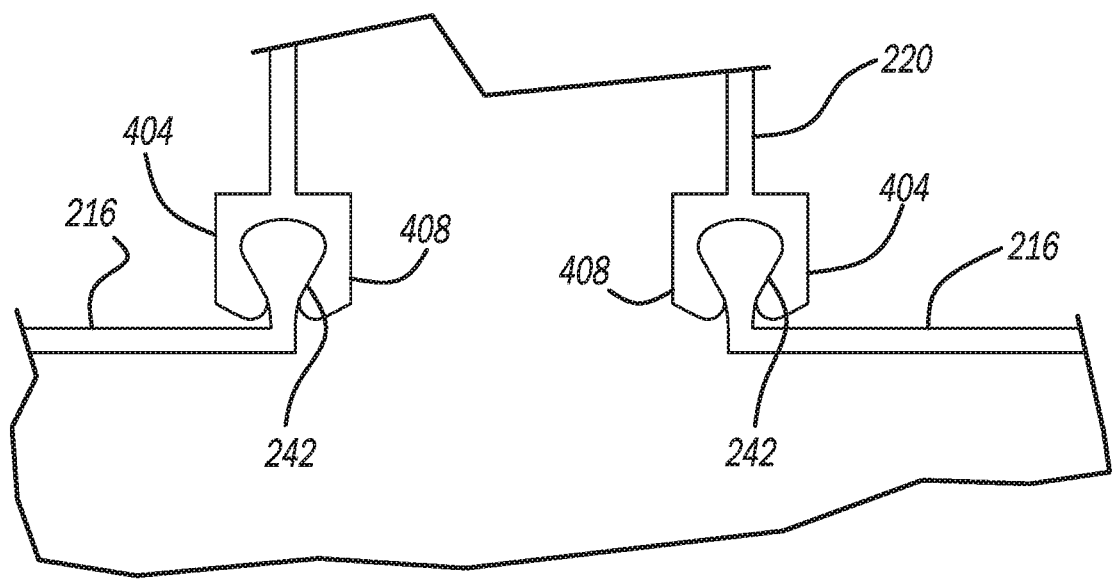
FIG. 4 is a cross-sectional view of a suppression chamber showing the coupling portion according to the present teachings.

With reference to FIG. 4, the first sound suppression chamber 220 may include a first retention member 404 and a second retention member 408 at a first end. The first retention member 404 and the second retention member 408 provide the first sound suppression chamber 220 with a coupling portion. The first sound suppression chamber 220 may be arranged such that the coupling member 242 is between the first retention member 404 and the second retention member 408 in order to couple the first sound suppression chamber 220 to the outer surface 216. The sound suppression chamber may be secured to the outer surface of the HVAC air handling assembly with another suitable mechanical fastening system, such as a snap-fit system. The first sound suppression chamber 220 may also be welded to the outer surface 216 at the aperture 304 or attached to the outer surface 216 with an adhesive. The first sound suppression chamber 220 may also be molded into the casing of the HVAC air handling assembly 124, the blower subassembly 204, and/or the HVAC subassembly 208 at the time of manufacturing.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A sound suppression chamber for a heating, ventilation and air conditioning (HVAC) air handling assembly, the sound suppression chamber comprising:
    a first end that includes an aperture that resonates with airflow from the HVAC air handling assembly, the airflow from the HVAC air handling assembly generating first and second incident sound waves corresponding to first and second target tones;
    a second end that is closed and opposite the first end;
    a middle portion that extends between the first end and the second end, the first end, the second end, and the middle portion defining a cavity of the sound suppression chamber; and
    a moveable partition located within the cavity of the sound suppression chamber and forming first and second subchambers within the sound suppression chamber, the moveable partition being moveable within the sound suppression chamber and adjustable such that at least one dimension of the first subchamber can be adjusted based on a frequency of the first target tone and at least one dimension of the second subchamber can be adjusted based on a frequency of the second target tone such that the first and second subchambers within the sound suppression chamber generate first and second reflected waves that are 180 degrees out of phase from the first and second incident sound waves, respectively, and reflected into the HVAC air handling assembly through the aperture to suppress the first and second target tones.

2. The sound suppression chamber of claim 1 wherein: the first end includes at least one retention member; and the at least one retention member is coupled to an aperture of an outer surface of the HVAC air handling assembly.

3. The sound suppression chamber of claim 2 wherein at least one dimension of the sound suppression chamber is selected based on a quarter wavelength of a frequency of the target tone to be suppressed.

4. The sound suppression chamber of claim 2 wherein at least one dimension of the sound suppression chamber is selected based on a quarter wavelength of a center frequency corresponding to a broadband frequency range to be suppressed.

5. The sound suppression chamber of claim 4 wherein the sound suppression chamber has a rectangular shape.

6. The sound suppression chamber of claim 1 wherein the sound suppression chamber is integrally formed with the HVAC air handling assembly.

7. The sound suppression chamber of claim 1 wherein the sound suppression chamber is positioned perpendicular to an outer surface of the HVAC air handling assembly.

8. A method for installing a sound suppression chamber of an HVAC air handling assembly, the method comprising:
    selecting the sound suppression chamber from a plurality of sound suppression chambers designed to suppress first and second target tones generated by airflow within the HVAC air handling assembly;
    removing a portion of a weakened section of an outer surface of the HVAC air handling assembly to create an aperture in the outer surface of the HVAC air handling assembly; and
    coupling the sound suppression chamber to a coupling member of the weakened section of the outer surface wherein:
        the sound suppression chamber includes a first end, a middle portion, a second end, and a moveable partition;
        the middle portion extends between the first end and the second end,
        the first end includes an aperture that receives airflow from the HVAC air handling assembly,
        the second end of the sound suppression chamber is being closed and opposite the first end,
        the second end and the middle portion defines a cavity of the sound suppression chamber,
        the airflow from the HVAC air handling assembly generates first and second incident sound waves corresponding to the first and second target tones, and
        the moveable partition is located within the cavity of the sound suppression chamber and forms first and second subchambers within the sound suppression chamber, the moveable partition being moveable within the sound suppression chamber and adjustable such that at least one dimension of the first subchamber can be adjusted based on a frequency of the first target tone and at least one dimension of the second subchamber can be adjusted based on a frequency of the second target tone such that the first and second subchambers within the sound suppression chamber generate first and second a reflected waves that are 180 degrees out of phase from the first and second incident sound waves, respectively and reflected into the HVAC air handling assembly through the aperture of the sound suppression chamber to suppress the first and second target tones.

9. The method of claim 8 wherein the sound suppression chamber has a rectangular shape.

10. The method of claim 8 wherein the sound suppression chamber is positioned perpendicular to the outer surface of the HVAC air handling assembly.

11. A heating, ventilation and air conditioning (HVAC) air handling assembly comprising:
    a blower subassembly;
    an HVAC subassembly;
    a plenum chamber that connects the blower subassembly and the HVAC subassembly; and
    a sound suppression chamber coupled to the plenum chamber that suppresses first and second target tones generated by airflow within the HVAC air handling assembly, wherein:
        the sound suppression chamber includes a first end, a middle portion, a second end, and a moveable partition,
        the first end includes an aperture that receives airflow from the HVAC air handling assembly, the middle portion extends between the first end and the second end, the second end of the first sound suppression chamber being closed, the first end, the second end, and the middle portion defining a cavity of the sound suppression chamber, the airflow from the HVAC air handling assembly generates first and second incident sound waves corresponding to the first and second target tones, respectively, and the moveable partition is located within the cavity of the sound suppression chamber and forms first and second subchambers within the sound suppression chamber, the moveable partition being moveable within the sound suppression chamber and adjustable such that at least one dimension of the first subchamber can be adjusted based on a frequency of the first target tone and at least one dimension of the second subchamber can be adjusted based on a frequency of the second target tone such that the first and second subchambers within the first sound suppression chamber generate first and second reflected waves that are 180 degrees out of phase from the first and second incident sound waves, respectively, and reflected into the HVAC air handling assembly through the aperture of the first sound suppression chamber to suppress the first and second target tones.

12. The HVAC air handling assembly of claim 11 wherein:

the plenum chamber includes at least one weakened section;

the at least one weakened section includes a coupling member and a removable portion;

the removable portion is configured to be removed to create an aperture in an outer surface of the plenum chamber;

the first end includes at least one retention member; and the at least one retention member is coupled to the coupling member of the at least one weakened section.

* * * * *

UNITED STATES PATENT AND TRADEMARK OFFICE
CERTIFICATE OF CORRECTION

| | | |
|---|---|---|
| PATENT NO. | : 11,193,693 B2 | Page 1 of 1 |
| APPLICATION NO. | : 16/121747 | |
| DATED | : December 7, 2021 | |
| INVENTOR(S) | : Prakash Thawani et al. | |

It is certified that error appears in the above-identified patent and that said Letters Patent is hereby corrected as shown below:

In the Claims

Column 10, Line 25: In Claim 8, before "closed", delete "being"

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*